Patented Aug. 2, 1927.

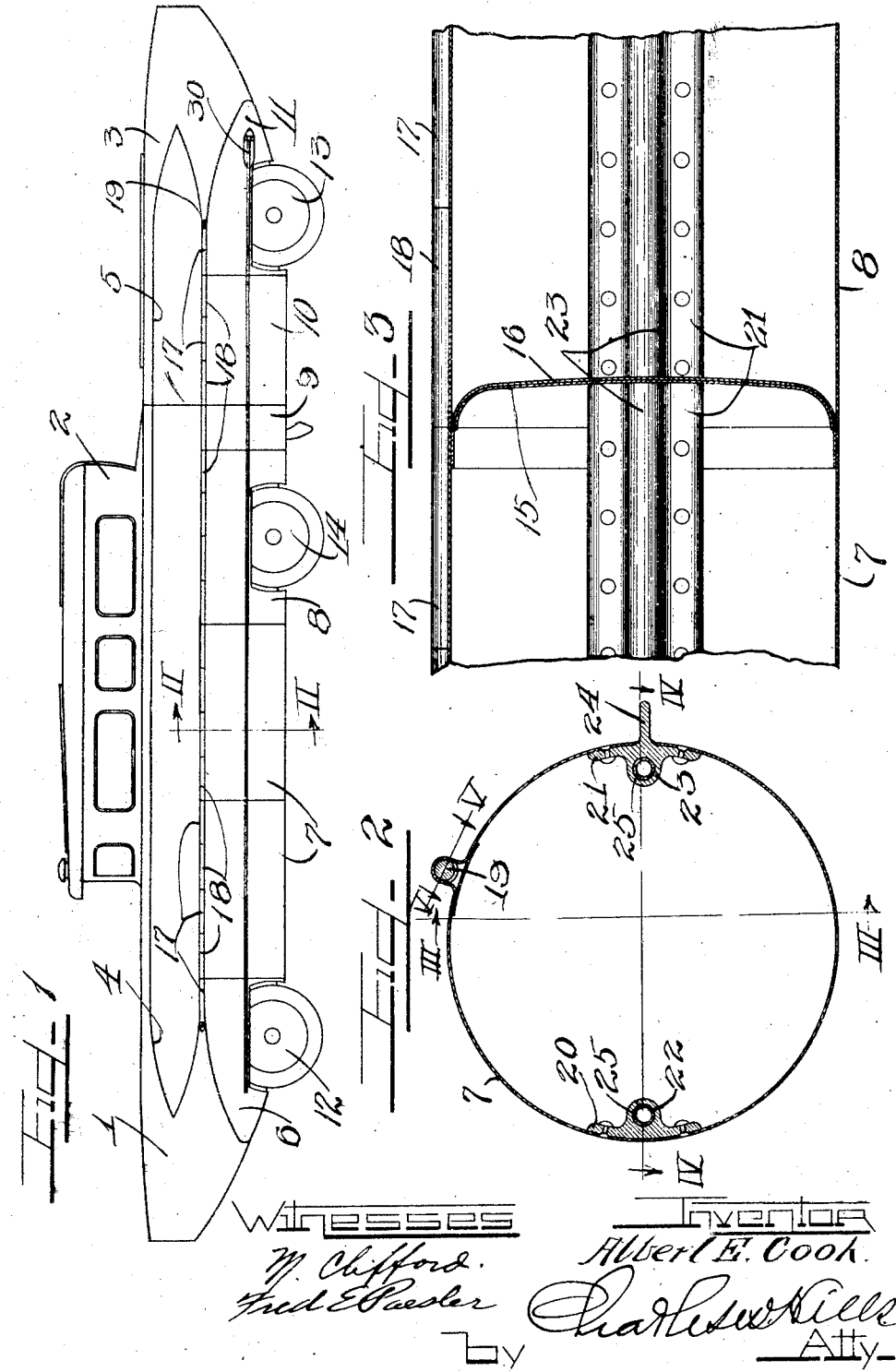

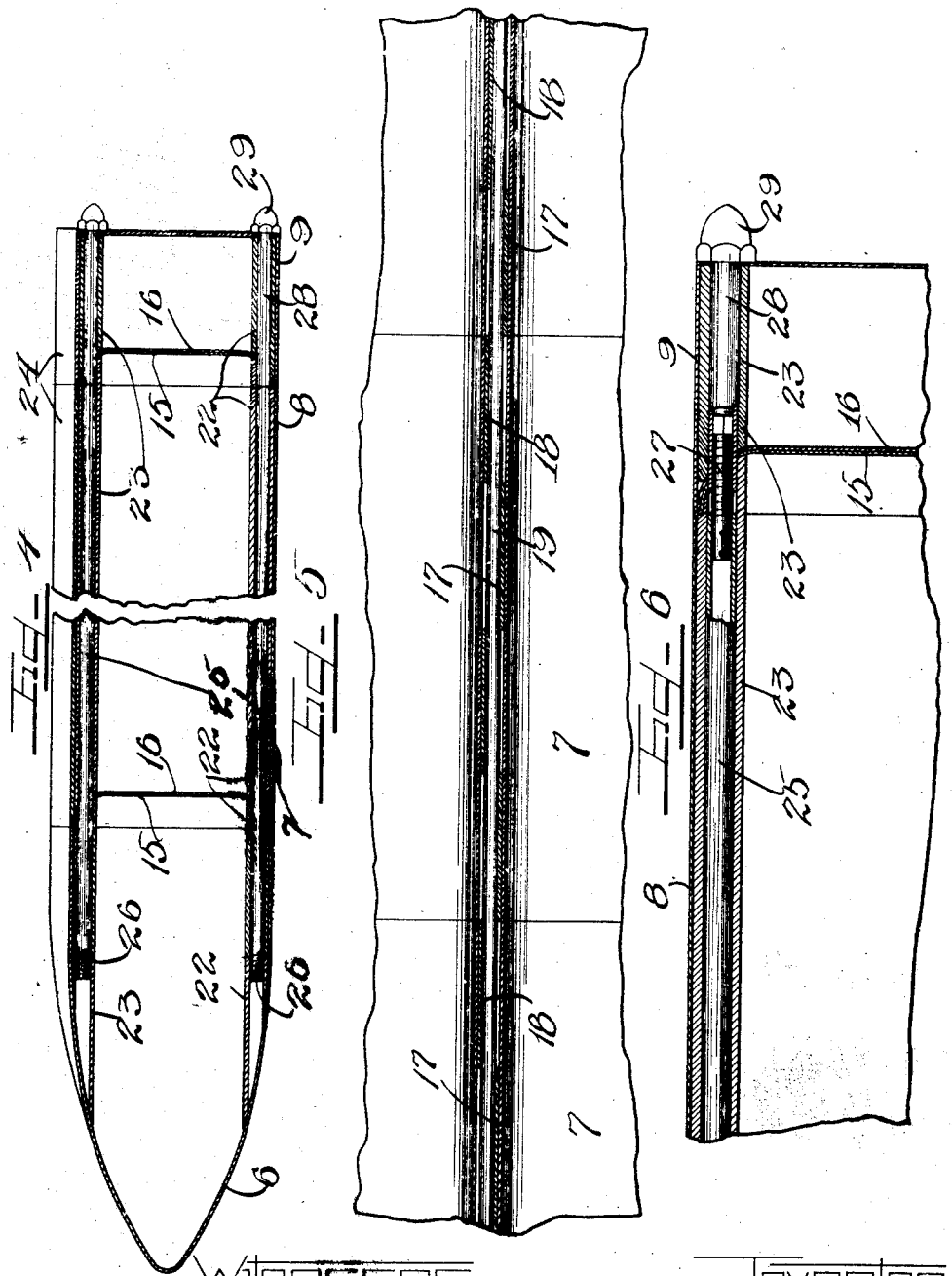

1,637,336

UNITED STATES PATENT OFFICE.

ALBERT EUGENE COOK, OF EVANSTON, ILLINOIS, ASSIGNOR TO CHARLES B. COOK, OF CHICAGO, ILLINOIS.

SECTIONAL PONTOON.

Application filed August 17, 1925. Serial No. 50,735.

This invention relates to an auto marine land and water craft and more particularly to the improved construction of the pontoons for the land and water craft, said pontoons being of sectional construction with the individual pontoon sections adapted to interfit with one another and be rigidly secured together by improved retaining means to afford unitary pontoons on opposite sides of the auto marine vehicle.

It is an object of this invention to provide improved sectional type pontoons for auto marine vehicles.

It is also an object of this invention to form the pontoons on opposite sides of an auto marine vehicle out of a plurality of interfitting sections, any number of which may be secured together by retaining means projecting longitudinally through the various sections which are to be secured together.

It is a further object of this invention to provide an auto marine vehicle with pontoons, said pontoons being formed with a plurality of interfitting independent sections of various sizes and constructions with certain of said pontoon sections constructed to carry supporting wheels for the auto marine vehicle.

It is furthermore an object of this invention to provide a pontoon of changeable length for an auto marine vehicle.

It is an important object of this invention to provide an auto marine vehicle with pivoted pontoon units, each of said units adapted to be pivotally mounted in position on a common hinge pin and comprising a plurality of abutting pontoon sections whereby the length of the pontoon units may be increased or decreased to conform with the length of the marine vehicle on which the pontoon units are used.

Other and further important objects of this invention will be apparent from the disclosures in the specification and the accompanying drawings.

This invention (in a preferred form) is illustrated in the drawings and hereinafter more fully described.

On the drawings:

Figure 1 is a side elevation of a combination land and water vehicle with a trailer equipped with improved sectional pontoons embodying the principles of this invention.

Figure 2 is an enlarged transverse detail section taken through one of the pontoon sections on line II—II of Figure 1.

Figure 3 is a fragmentary detail section taken on line III—III of Figure 2.

Figure 4 is a slightly reduced longitudinal section taken on line IV—IV of Figure 2 and illustrating a pontoon unit of the main body portion of the vehicle only.

Figure 5 is a fragmentary detail section of the hinge section taken on line V—V of Figure 2.

Figure 6 is a fragmentary longitudinal section of one of the pontoon units illustrating the construction of the connecting bolts for holding a plurality of pontoon sections secured together.

As shown on the drawings:

The reference numeral 1 indicates an auto marine vehicle main body section provided with a top 2 and having the rear end thereof of practically flat construction to permit one end of a trailer body section 3 to be secured thereto to cause the auto marine vehicle to have an increased length when used either on land or in the water. The main body section 1 and the trailer body section 3 are each provided with pontoon pockets or recesses 4 and 5 respectively for receiving a pontoon unit when in its raised position when the vehicle is used as a water craft.

Pivotally mounted on each side of the auto marine vehicle is a pontoon unit which comprises a plurality of independent pontoon sections 6, 7, 8, 9, 10 and 11. The pontoon sections 6 and 11 are end sections and are tapered as illustrated in Figure 1 of the drawings. The front pontoon section 6 carries a front wheel 12 while the rear pontoon section 11 on the trailer body carries a trailer wheel 13. The pontoon section 8 on the main body of the vehicle carries a rear driving wheel 14. The pontoon section 9 is a short section and normally is the last pontoon section for the main body portion of the vehicle. The pontoon sections 7, 9 and 10 may be of any desired length depending on the size of the vehicle and the length of the pontoon units to be used on the vehicle.

Each of the pontoon sections is independently air tight and is provided with a convex end wall 15 and with a concave end wall 16. The end pontoon sections 6 and 11 are provided with only one end wall, the pontoon section 6 being provided with a convex wall 15 while the end pontoon section 11 is provided with a concave end wall 16. Both of the end sections 6 and 11 are tapered at one end. The various pontoon sections are provided with hinge sleeves 17 which are adapted to be positioned between hinge sleeves 18 provided on the sides of the main body section 1 and the trailer body 3. A long continuous hinge pin or bolt 19 projects through the registering hinge sleeves 17 and 18 on each side of the vehicle for the purpose of pivotally holding the pontoon units in position. When the trailer 3 is removed from the main body of the vehicle the long hinge pins or bolts are removed and are replaced by shorter hinge pins or bolts of a length sufficient to support the pontoon sections of the main body 1 and the trailer 3 respectively in their proper positions.

As illustrated in Figures 2, 4 and 6, each of the pontoon sections is provided with a pair of oppositely disposed bracket plates 20 and 21 which are respectively provided with integral sleeves 22 and 23. Each of the brackets 21 is also provided with an outwardly projecting flange 24. The various flange sections 24 form a continuous rib on the outer side of each pontoon unit when the pontoon units are in their lowered position to afford a protecting rib or fender for the pontoon units when the vehicle is used on land.

Figures 4 and 6 illustrate improved connecting means whereby the various pontoon sections of the vehicle body 1 may be rigidly connected together when the trailer is connected with the main portion of the vehicle. The retaining means for the pontoon sections comprises a long hollow body bolt 25, one end of which is externally threaded at 26 and is adapted to be threaded into the sleeve 23 of the end pontoon section 6. The other end of the hollow retaining bolt 25 has rigidly secured therein the stub end of a threaded connecting bolt or coupler 27 (Figure 6), said connecting bolt projecting out of the end of the hollow bolt 25 and into the sleeve 23 of the pontoon section 9. Projecting through the sleeve 23 of the pontoon section 9 is a hollow extension or auxiliary body bolt 28 provided with a head 29 at its outer end. The inner end of the hollow bolt is internally threaded and is adapted to be screwed onto the coupling bolt 27. Similar hollow retaining bolts 25 and 28 are removably engaged in the sleeves 22 of the bracket members 20 within the various pontoon sections. It will thus be seen that the various pontoon sections on the opposite sides of the main body 1 of the vehicle interfit with one another and are rigidly secured together by means of the bolts 25—28, so that pontoon units are provided for the main body of the vehicle with each of the pontoon sections being air tight independent of one another to afford an auto marine vehicle wherein a sufficient number of pontoon sections may practically always be in working condition even though damage may be done to one or more of the remaining pontoon sections.

When the trailer is secured to the main body 1 of the vehicle as illustrated in Figure 1 the short auxiliary hollow bolts 28 are removed and longer auxiliary bolts 30 (Figure 1) similar in construction to the bolts 28 are engaged in the sleeves 22 and 23 of the trailer pontoon sections 10 and 11 and in the corresponding sleeves of the end pontoon section 9 of the body 1 to afford a means for holding all of the pontoon sections on each side of the vehicle rigidly connected together.

When the vehicle is used as a land transport in its elongated form as illustrated in Figure 1, the pontoon sections on each side of the vehicle are rigidly connected together as hereinbefore described by means of the connecting or retaining bolts and are hingedly supported in position to permit the pontoon units to be held in their lowered position so that the various wheels 12, 13 and 14 of the vehicle may track on the ground and support the entire vehicle.

When it is desired to use the vehicle as a water craft the vehicle may be run from the land directly into the water after which the pontoons may be released and swung upwardly from their lowered positions into the upper pontoon pockets 4 and 5 of the vehicle body sections to increase the draft of the craft.

It will be noted that this invention covers improved pontoon units which are for auto marine vehicles, said pontoon units being constructed of a plurality of interfitting, independent, air tight pontoon sections, said pontoon sections being adapted to be rigidly connected one to the other to form a continuous pontoon unit with connecting means, said means being hollow bolt sections of any required length depending upon whether or not the pontoon units of the trailer are connected with the pontoon units of the main body of the vehicle.

I am aware that many changes may be made and numerous details of construction may be varied through a wide range without departing from the principles of this invention, and I therefore do not purpose limiting the patent granted hereon, otherwise than necessitated by the prior art.

I claim as my invention:

1. The combination with an auto marine vehicle, of a pontoon unit hingedly supported thereon and comprising a plurality of interfitting, independently, air tight pontoon sections, and extensible bolt connecting means for rigidly securing said pontoon sections together to form the pontoon unit.

2. The combination with an auto marine vehicle, of pontoon units, means for movably connecting said pontoon units to opposite sides of the vehicle, each of said pontoon units comprising a plurality of air tight pontoon sections adapted to interfit with one another, sleeve brackets rigidly secured within said pontoon sections, and coupler bolts for rigidly securing all of said interfitting pontoon sections together.

3. The combination with an auto marine vehicle and trailer, of pontoon units movably secured on opposite sides of said vehicle and trailer, each of said pontoon units comprising a plurality of air tight, interfitting pontoon sections, and removably connected hollow bolt members for rigidly securing all of the pontoon sections together to form the pontoon unit.

4. The combination with a land and water vehicle and its trailer, of pontoon units disposed on opposite sides thereof, hinge means for pivotally connecting said pontoon units to said vehicle and trailer, each of said pontoon units comprising a plurality of interfitting, air tight pontoon sections, bracket members secured in each of said sections, sleeves forming integral parts of said brackets, with the sleeves of one pontoon adapted to be aligned with those of the others, hollow bolts projecting through the sleeves of the pontoon sections of said vehicle, and auxiliary hollow bolt members projecting through the sleeves of the pontoon sections of said trailer, and removably connected to the hollow bolts of said vehicle to rigidly hold all of the pontoon sections of the vehicle and trailer rigidly secured together.

5. The combination with an auto marine vehicle of a pontoon unit hingedly connected thereto, said pontoon unit comprising a plurality of independent, air tight pontoon sections, sleeve brackets rigidly secured within each of said pontoon sections, and extensible bolt members adapted to project through all of said sleeves to rigidly hold the pontoon sections secured together as a unit.

6. The combination with an auto marine vehicle and trailer, of a pontoon unit hingedly supported thereon, said pontoon unit comprising a pair of air tight end pontoon sections, a plurality of intermediate air tight sections disposed between said end sections, bracket members rigidly secured within each of the end and intermediate pontoon sections, and extensible bolt means adapted to be engaged in said bracket members for rigidly holding all of the pontoon sections seated one within the other to form the elongated pontoon unit.

7. The combination with a land and water craft, of pontoon units movably supported thereon, each of said units comprising a plurality of interfitting, air tight pontoon sections, wheels supported on certain of said pontoon sections, sleeve members rigidly secured on opposite sides of the interior of said pontoon sections with the sleeves of the one section adapted to register with those of the others, hollow bolts projecting through the sleeves of certain of said pontoon sections, and hollow auxiliary bolt means adapted to project through the sleeve members of the remaining pontoon sections with the inner ends of said auxiliary bolts removably secured to said main bolts to rigidly hold all of the pontoon sections together to form a unit.

8. In a land and water craft of the class described, the combination with a plurality of interfitting pontoon sections, of sleeve members rigidly secured in each of said pontoon sections with the sleeve members of the one pontoon section adapted to register with those of the other, main bolt means projecting through the registering sleeves of said pontoon sections, and auxiliary bolt means adapted to project through the sleeves of certain of the pontoon sections and be connected to said main bolt means to rigidly hold all of said pontoon sections rigidly secured together.

9. In a land and water craft of the class described, the combination with a plurality of interfitting pontoon sections, of sleeve members secured in each of said sections with the sleeve members of the one section registering with those of another section, main bolt units projecting through the sleeves of certain of said pontoon sections, threaded extensions rigidly secured to said main bolts, and headed auxiliary bolts adapted to project through the sleeves of other of said pontoon sections with the inner ends of said auxiliary bolts adapted to be removably engaged with said threaded extensions of said main bolts to rigidly hold all of the said pontoon sections together to form a pontoon unit.

10. In an auto marine vehicle of the class described, the combination with a pontoon unit comprising a plurality of interfitting, air tight pontoon sections, of extensible bolts adapted to extend longitudinally through the pontoon sections to rigidly hold the same together to form a pontoon unit.

11. The combination with a plurality of interfitting, air tight pontoon sections, of sectional extensible bolt members adapted to rigidly hold said pontoon sections secured together to form a pontoon unit.

12. The combination with a plurality of interfitting pontoon sections, of bolt means for securing said pontoon sections together to form a pontoon unit, said bolt means comprising hollow bolt sections, and means for rigidly connecting said hollow bolt sections together to form a continuous retaining bolt.

13. The combination with an auto marine vehicle, of sectional pontoons adjustably mounted on opposite sides thereof, and extensible bolts for removably securing the pontoon sections on each side of the vehicle together.

14. The combination with an auto marine vehicle of a plurality of independent pontoon sections movably mounted thereon and extensible bolts for securing said sections together to form a single pontoon unit.

15. In a land and water craft of the class described, the combination of a plurality of interfitting pontoon sections, and means adapted to connect said pontoon sections to form a pontoon unit, said means comprising hollow bolt sections connected by coupling bolts.

16. The combination with a plurality of interfitting pontoon sections, of extensible bolts adapted to connect a plurality of said sections together to form a unit.

In testimony whereof I have hereunto subscribed my name.

ALBERT E. COOK.